(12) United States Patent
King

(10) Patent No.: US 7,288,201 B2
(45) Date of Patent: Oct. 30, 2007

(54) METHODS FOR REMOVING MOISTURE FROM HYDROGEN HALIDES

(75) Inventor: Mackenzie King, Danbury, CT (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/427,736

(22) Filed: May 1, 2003

(65) Prior Publication Data

US 2004/0031758 A1    Feb. 19, 2004

Related U.S. Application Data

(63) Continuation of application No. 09/653,213, filed on Aug. 31, 2000, now abandoned, which is a continuation of application No. 08/902,459, filed on Jul. 29, 1997, now abandoned.

(51) Int. Cl.
  *B01D 53/02* (2006.01)
  *C01B 7/07* (2006.01)
  *C01B 7/09* (2006.01)

(52) U.S. Cl. ................. 210/679; 210/689; 95/117; 423/488

(58) Field of Classification Search ............ 95/117; 210/679, 689; 423/488, 163, 497, 498
  See application file for complete search history.

(56) References Cited

U.S. PATENT DOCUMENTS

| | | | |
|---|---|---|---|
| 2,196,246 A | | 4/1940 | Brown et al. .................. 23/154 |
| 2,201,206 A | * | 5/1940 | Fritz et al. .................... 423/498 |
| 2,348,702 A | * | 5/1944 | Ipatieff et al. ............... 208/112 |
| 3,647,367 A | | 3/1972 | Macey ......................... 423/470 |
| 3,760,050 A | * | 9/1973 | Blaker et al. .................. 264/82 |
| 3,773,471 A | * | 11/1973 | Macey ........................ 422/202 |
| 3,893,920 A | | 7/1975 | Hubbard et al. ............. 210/197 |
| 4,588,709 A | | 5/1986 | Morales et al. ............. 502/314 |
| 4,604,270 A | | 8/1986 | Tom ............................ 423/262 |
| 4,695,487 A | | 9/1987 | Cho ............................. 427/294 |
| 4,707,299 A | | 11/1987 | Block ....................... 252/400.1 |
| 4,743,372 A | | 5/1988 | Kumagai et al. ......... 210/195.2 |
| 4,820,672 A | * | 4/1989 | Mehta ......................... 502/115 |
| 4,832,935 A | | 5/1989 | Lester et al. ................ 423/483 |
| 4,840,637 A | | 6/1989 | Rolffs ............................. 8/402 |
| 4,853,148 A | | 8/1989 | Tom et al. .................. 252/194 |
| 4,867,960 A | | 9/1989 | Tom ........................... 423/488 |
| 4,925,646 A | | 5/1990 | Tom et al. .................. 423/488 |

(Continued)

FOREIGN PATENT DOCUMENTS

DE            3129848 A1    2/1983

(Continued)

OTHER PUBLICATIONS

Abstract of Japan. Publication No. 57015840, Publication Date Jan. 27, 1982, Title: Hydroscopic Agent (1 page).

(Continued)

*Primary Examiner*—Fred G. Prince
(74) *Attorney, Agent, or Firm*—Hamilton, Brook, Smith & Reynolds, P.C.

(57) ABSTRACT

A composition comprising a magnesium halide coated macroporous carbonaceous substrate is provided for effecting moisture removal from a hydrogen halide fluid. Moisture removal is effected by intimately contacting the hydrogen halide fluid with the magnesium halide coated macroporous carbonaceous substrate and separating the fluid from the coated substrate.

25 Claims, 3 Drawing Sheets

U.S. PATENT DOCUMENTS

| | | | |
|---|---|---|---|
| 4,959,076 A | 9/1990 | Rolffs | 8/402 |
| 5,094,754 A | 3/1992 | Maroldo et al. | 210/635 |
| 5,135,548 A | 8/1992 | Golden et al. | 55/25 |
| 5,202,106 A | 4/1993 | Venlautem | 423/488 |
| 5,240,612 A | 8/1993 | Grangeon et al. | 210/636 |
| 5,322,674 A | 6/1994 | Mori | 423/240 S |
| 5,401,876 A * | 3/1995 | Correia et al. | 562/603 |
| 5,539,998 A | 7/1996 | Mostowy et al. | 34/343 |
| 5,597,545 A | 1/1997 | Chang et al. | 423/484 |
| 5,637,544 A | 6/1997 | Shadman | 502/4 |
| 5,645,853 A * | 7/1997 | Winston et al. | 424/440 |
| 5,766,565 A | 6/1998 | Cronin et al. | 423/488 |
| 5,827,492 A | 10/1998 | Corbin et al. | 423/488 |
| 5,910,292 A | 6/1999 | Alvarez, Jr. et al. | 423/210 |
| 5,958,356 A * | 9/1999 | Dong et al. | 423/488 |

FOREIGN PATENT DOCUMENTS

| | | | |
|---|---|---|---|
| DE | 215064 A | | 4/1983 |
| EP | 894527 | | 2/1999 |
| FR | 845.760 | | 9/1939 |
| GB | 2188043 | | 9/1987 |
| GB | 2 223 505 | * | 4/1990 |
| JP | S57-015840 | | 1/1982 |
| JP | 62-106821 | * | 5/1987 |
| JP | H5-13695 | | 2/1993 |
| RU | 1726368 | | 4/1990 |
| WO | WO 90/07971 | | 7/1990 |

OTHER PUBLICATIONS

European Search Report, Application No. 98114019; European Patent Office, Oct. 16, 1998 (2 pages).

Brochure entitled, "Technical Notes—Ambersorb Carbonaceous Adsorbents Specialty Purifications," Rohm and Haas Company, Philadelphia, PA; Aug. 1992 (10 pages).

*The Merck Index: An Encyclopedia of Chemicals, Drugs and Biologicals*, Merck & Co., Inc. (Whitehouse Station: NJ) p. 969 (1996).

* cited by examiner

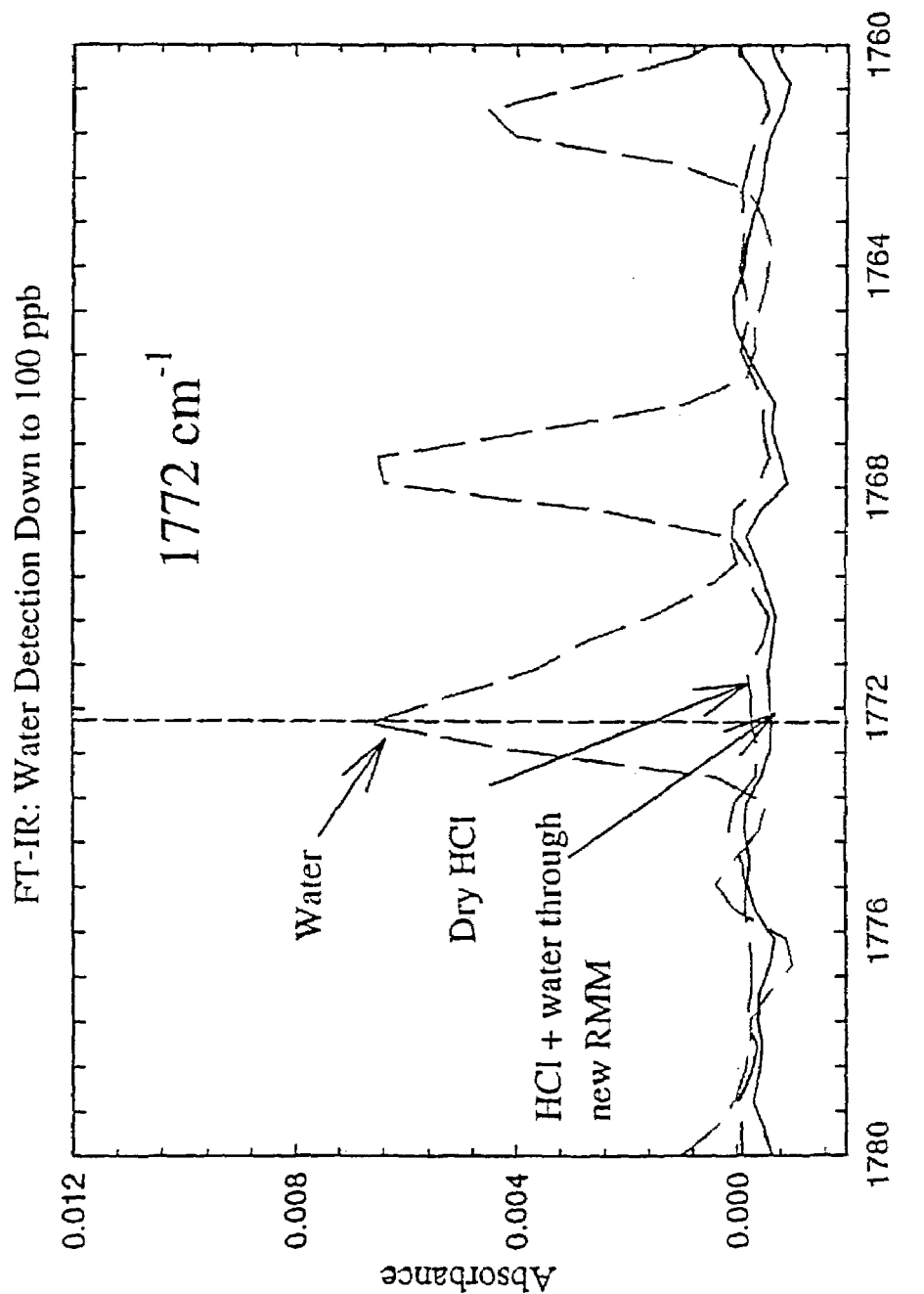

METHODS FOR REMOVING MOISTURE FROM HYDROGEN HALIDES

RELATED APPLICATIONS

This application is a Continuation Application of U.S. Ser. No. 09/653,213 filed Aug. 31, 2000 now abandoned, which is a Continuation of Ser. No. 08/902,459, filed Jul. 29, 1997 now abandoned, the entire teachings of which are incorporated herein by reference.

BACKGROUND OF THE INVENTION

1. Field of the Invention

This invention relates to a composition and process for removing moisture from a hydrogen halide.

2. Description of the Prior Art

At the present time, gaseous and liquid hydrogen halides are utilized as high purity anhydrous compositions. Anhydrous hydrogen halides are commonly used in the semiconductor industry such as for cleaning reactor tubes and susceptors and as an etchant for manufacturing microcircuits.

In such applications, highly efficient water vapor or liquid removal from hydrogen halides such as hydrogen chloride is required before its introduction to the end-use environment. Hydrogen chloride is normally a gas and sometimes is transported, under pressure, as a liquid. Hydrogen chloride becomes a liquid at 615 psig. Water-containing hydrogen chloride is highly corrosive in character, and thus will necessitate frequent replacement of piping, manifolds, valves, etc., with which it comes into contact. In cleaning susceptors, i.e., the support structures on which wafers are processed, the presence of water in the hydrogen chloride will result in the formation of new oxides on the susceptor, thus opposing the cleaning function which is sought to be carried out. In etching applications, water-containing hydrogen chloride is a source of undesirable moisture contamination in the semiconductor manufacturing environment, which may render the microcircuitry chip products made in such an environment deficient or even useless for their intended purpose.

Among the methods which have been utilized by the prior art for removing water from hydrogen chloride is the use of moisture-sorptive molecular sieves. The difficulty of employing such methods for production of high-purity hydrogen chloride is that hydrogen chloride is competitive with water for the absorption sites on the molecular sieves. As a result, it is not possible to obtain the necessary lower residual water values, on the order of 10 parts per million by volume concentration and less, in the effluent from the molecular sieve contacting step.

Hydrogen chloride has also been treated with sulfuric acid or phosphoric acid to produce dehydrated hydrogen chloride. Such dehydration methods, however, have the associated disadvantage that they add sulfur or phosphorous to the hydrogen chloride, and these added elements are highly undesirable contaminants in the aforementioned semiconductor manufacturing applications.

It has also been proposed to utilize magnesium chloride supported on alumina to effect removal of moisture from a hydrogen halide. It has been found that this purifying material is undesirable when contacted with high pressure hydrogen chloride such as in its liquid form since aluminum reacts with the hydrogen chloride to form aluminum trichloride particles which clog filters through which the hydrogen chloride is passed to effect its purification.

In addition, the formation of magnesium chloride on alumina involves multiple reaction steps wherein the alumina is first coated with a solution, e.g., 15% by weight of dibutylmagnesium in hexane solvent. The solvent is removed by evaporation while heating. The dibutylmagnesium is converted to magnesium hydride on alumina by heating to about 250° C. The magnesium hydride then is converted to magnesium chloride on alumina with concentrated hydrogen chloride. This composition then is used to remove moisture from hydrogen halides.

Hydrogen bromide is another example of a hydrogen halide which is required in essentially completely water-free condition in the semiconductor manufacturing field. Hydrogen bromide is used in the electronics industry as an etchant for wafers, and as a cleaning agent for susceptors. In these applications, the presence of water impurity in the hydrogen bromide will result in the same disadvantages noted hereinabove in connection with hydrogen chloride in similar applications. In addition, when hydrogen bromide is used as an etchant for wafers, hazing has been found to result when the hydrogen bromide contains even minute amounts of water vapor.

The art has attempted to achieve removal of water from hydrogen bromide by the use of phosphoric acid as a drier. This method, while generally useful to remove the water contaminant, nonetheless has the attendant disadvantage that it adds phosphorous to the hydrogen bromide, which as indicated above in connection with hydrogen chloride, is a significant contaminant in the semiconductor manufacturing process.

Accordingly, it would be desirable to provide a composition and process for removing moisture from hydrogen halides and which does not produce a contaminating by-product such as particles. In addition, it would be desirable to provide such a composition and process which has a high capacity for removing moisture from hydrogen halides either in gaseous or liquid form. Furthermore, it would be desirable to provide such a composition which can be formed from a simplified process as compared to presently available processes for forming analogous compositions.

SUMMARY OF THE INVENTION

This invention provides a composition for removing moisture from a hydrogen halide fluid comprising a macroporous carbonaceous support upon which is deposited a magnesium halide which is either magnesium chloride or magnesium bromide. The magnesium halide is deposited on the surface of the macroporous carbonaceous support for first admixing the support with a solution of dibutyl magnesium in order to coat the surfaces of the support with dibutyl magnesium. The solvent forming the solution then is removed by evaporation in a non-reactive environment. Thereafter, the coated support is contacted with hydrogen halide fluid to convert the dibutylmagnesium to the magnesium halide. This process avoids the need for forming magnesium hydride.

In use, the support coated with magnesium halide is intimately contacted with a hydrogen halide fluid to effect substantially complete removal of moisture from the hydrogen halide fluid. The halide of the hydrogen halide fluid and of the magnesium halide must be the same to prevent contamination of the fluid.

BRIEF DESCRIPTION OF THE DRAWING

FIG. 3 is a graph of a Fourier Transform Infra Red spectra illustrating the water removal capacity from HCl of the composition of this invention.

DESCRIPTION OF THE SPECIFIC EMBODIMENTS

Figure 1:
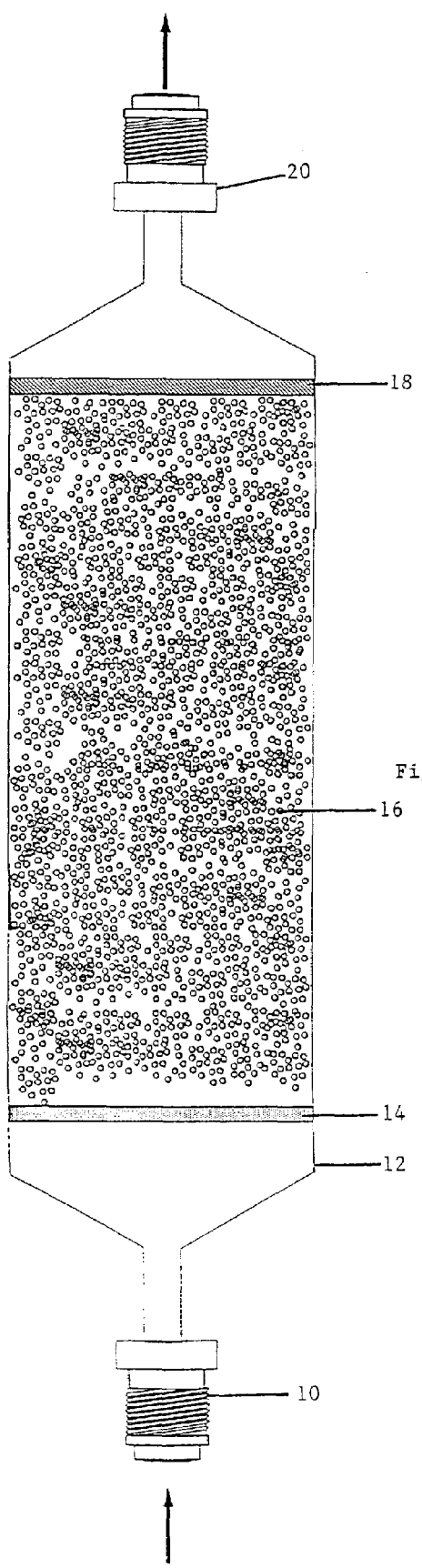
FIG. 1 illustrates the use of the present invention.

The composition of this invention comprises a macroporous carbonaceous support having an average pore size greater than about 100 Angstroms up to about 100 μm, preferably between about 20 A and about 1000 A which is coated with magnesium halide. Suitable carbonaceous supports are formed, for example, by pyrolyzing polymeric resins. Representative suitable supports are formed by pyrolyzing sulfonated styrene/divinylbenzene macroreticular ion exchange resin and are disclosed, for example, by U.S. Pat. No. 5,094,754, which is incorporated herein by reference. Such carbonaceous supports are available from Rohm and Haas Company, Philadelphia, Pa. under the registered trademark AMBERSORB®.

The magnesium halide coating is formed on the particulate macroporous carbonaceous support by first intimately contacting the support with a solution of adialkyl magnesium compound such as dimethyl, diethyl, dibutyl or dipropyl magnesium, preferably dibutyl magnesium. Representative suitable solvents for forming the solution include hexane, heptane or the like. Contact of the support and the solution typically is effected for a time between about 1 hour and about 4 hours, at a temperature between about 25° C. and about 70° C. The resultant coated support is separated from the solution and excess solvent is removed therefrom such as by evaporation. Evaporation can be effected by heating such as to a temperature between about 55° C. and about 65° C. in an inert or nonreactive atmosphere such as nitrogen or an inert gas.

In a final step, the coated support is contacted with a hydrogen halide gas either alone or in a non reactive carrier gas such as nitrogen wherein they hydrogen halide comprises between about 5% and 100% volume percent of the gas. In this final step, the dialkyl magnesium is converted to magnesium halide. Hydrogen chloride is utilized as the hydrogen halide when the coated support is used to dry hydrogen chloride fluid. Hydrogen bromide may be utilized as the hydrogen halide when the coated support is used to dry hydrogen bromide fluid. Contact with the hydrogen halide fluid is effected for a time and at temperature wherein substantially complete conversion of the dialkyl magnesium to the magnesium halide is effected. Typical contact times are between about 1.1 min/ml of resin and about 5.5 min/ml of resin, preferably between about 1.6 min/ml and about 5.5 min/ml. Typical reaction temperatures are between about 25° C. and about 240° C., preferably between about 40° C. and about 60° C.

The compositions of this invention are capable of removing moisture from a hydrogen halide fluid even at high pressures wherein the fluid is a liquid without formation of reactive products such as particulate reaction products which contaminate the hydrogen halide. In addition, the compositions of this invention are capable of withstanding high pressure liquid halide up to a pressure of about 1100 psig at 50° C.

The magnesium halide coating is sufficient to render the composition of this invention useful for removing moisture from a hydrogen halide fluid to less than about 100 ppb, preferably less than about 50 ppb but without significantly blocking the support macropores. The compositions of this invention are characterized by a moisture absorption capacity in excess of about 40 liters of water per liter of coated support, preferably in excess of about 60 liters of water per liter of coated support. The concentration of magnesium halide exceeds at least about 0.1 moles of magnesium halide per liter of carbonaceous support, preferably in excess of at least about 1.2 moles of magnesium halide per liter of carbonaceous support.

In use, the composition of this invention is intimately contacted with a fluid hydrogen halide either as a flowing fluid stream or quiescent in a container for the hydrogen halide in a manner so that substantially all of the hydrogen halide contacts the composition.

Referring to FIG. 1, hydrogen halide fluid to be dried is introduced into inlet 10 of housing 12. The fluid is passed through a retaining frit 14 and into the bed 18 of the coated carbonaceous particles of this invention wherein moisture is removed from the fluid. The fluid then is passed through filter 18 and out outlet 20 to a site of use (not shown).

The following examples illustrate the present invention and are not intended to limit the same:

EXAMPLE I

This example illustrates a method for making the magnesium chloride coated product of this invention.

Two hundred (200) ml of Ambersorb® 563 carbonaceous adsorbent are cleaned in 200 ml of a 10% methanol/water solution. Ambersorb® 563 is available from Rohm and Haas Company, Philadelphia, Pa. and has a surface area of 550 $m^2/g$ and a macroporosity of 0.23 ml/g as measured by nitrogen porosimetry. The solution is poured off and the beads are rinsed three more times with methanol. The support is air dried until free flowing and then put into a 1000 ml cylinder with $N_2$ entering from the bottom while the cylinder is heated to 100° C. for about 4 hours until most of the bulk water/methanol solution has been removed at which point the cylinder temperature is raised to 240° C. for 15 hours. At the end of this activation period the support is cooled to 60° C. Enough 15% dibutyl magnesium in heptane solution is added to fill the void volume of the carbon and then nitrogen flowing from the bottom of the cylinder is used to blow off ≈75% of the heptane. This step is repeated until all the dibutyl magnesium in heptane has been added. Stirring is required to achieve a homogeneous mixture and prevent caking. The dibutyl magnesium on the Ambersorb® 563 carbonaceous adsorbent is kept under a 1 slpm nitrogen stream at 55° C. for a full day and subsequently the carbonaceous adsorbent is isolated, brought into a glove box and put in a sample cylinder appropriate for hazardous gas handling. The gas sample cylinder with the carbonaceous adsorbent is connected to a gas manifold capable of flowing both anhydrous HCl and dry nitrogen. A two fold excess of 5% HCl in nitrogen and 15 psia and 1000 sccm is passed over the carbonaceous adsorbent at which point pure HCl at 15 psia and 1000 sccm is then passed over the carbonaceous adsorbent for 30 minutes and the vessel is then pressurized to 60 psig with HCl overnight. The carbonaceous adsorbent is purged with 1000 sccm $N_2$ the following morning and the sample cylinder is heated to 240° C. for 52 hours. This purging would be more effective with high pressure $CO_2$. The final product emits less than 1 ppm total hydrocarbons at 26° C.

EXAMPLE II

This example illustrates the use of the product of this invention for removal of moisture from nitrogen and HCl.

Tests were performed to determine whether the coated carbonaceous adsorbent can dessicate a nitrogen gas stream. To test water retention, $N_2$ or HCl gas at 500 sccm is dried with a conventional hydrogen halide purifier. The HCl gas then is either passed through the purifier apparatus illustrated in FIG. 1 or can bypass the purifier. The bypass stream is representative of the background water level. The resultant gas stream is directed to a 10 meter path length gas cell kept at 130° C. for use with a Fourier Transform Infrared analysis apparatus (FT-IR). Four (4) PPM water in 100 sccm $N_2$ is added to the gas stream (for a total flow of 600 sccm) on demand.

Figure 2:
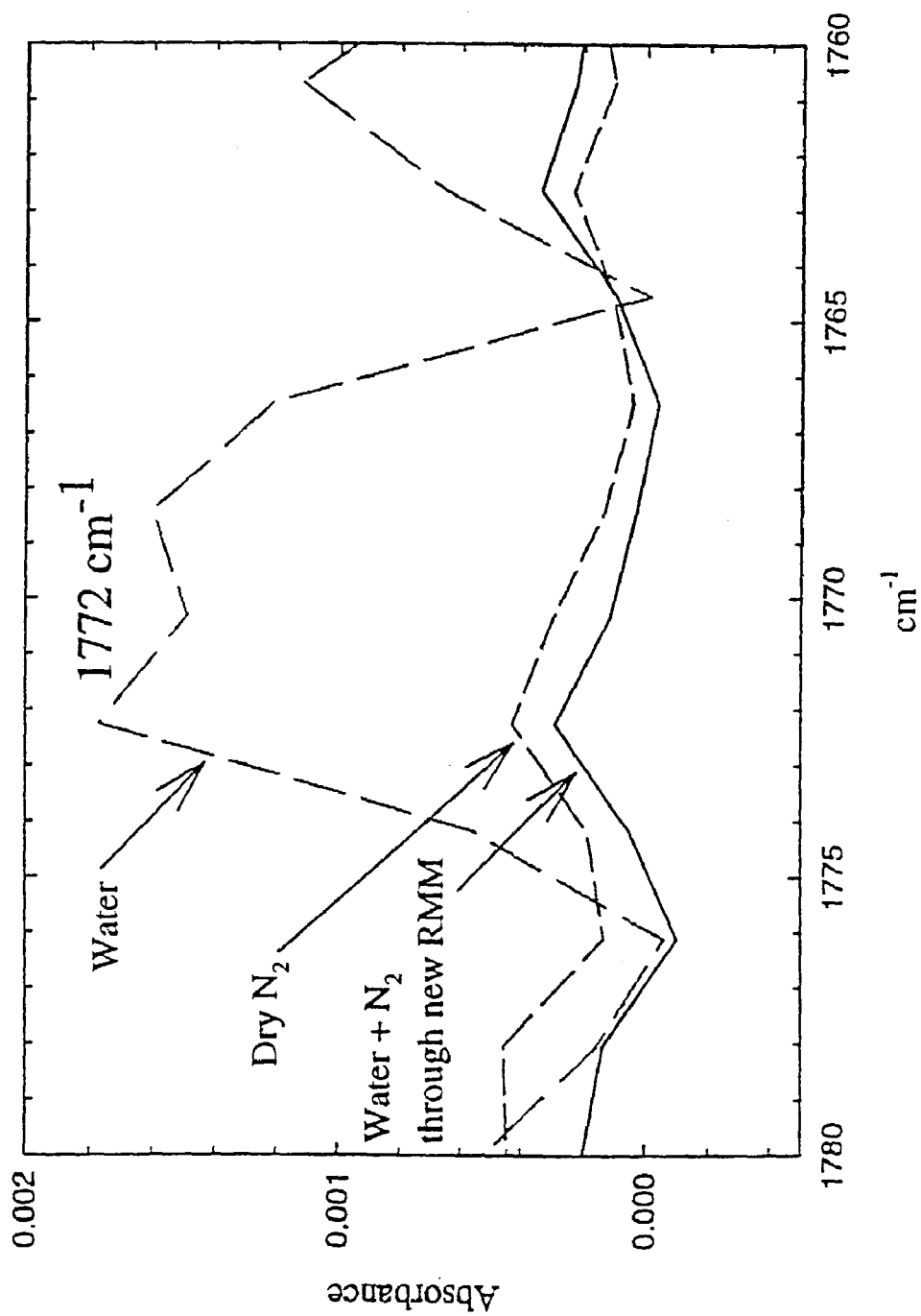
FIG. 2 is a graph of a Fourier Transform Infra Red spectra illustrating the water removal capacity from nitrogen of the composition of this invention.

The composition of the FT-IR spectrum exhibits the ability to remove water moisture from $N_2$ to levels less than 100 ppb. FIG. 2 shows three FT-IR spectra at 1772 cm$^{-1}$ to illustrate the water retention ability of the composition of this invention in $N_2$.

$N_2$ dried by the conventional purifier and which bypasses the composition of this invention is denoted "Dry $N_2$". "Water" refers to the wet (4 PPM) $N_2$ gas stream which bypasses the composition of this invention and "New purifier+Water" refers to the wet $N_2$ passed through the composition of Example I. It is evident from the spectra that there is no difference between "Dried $N_2$" and "New purifier+Water" indicating that the conventional purifier and the purifier of this invention are capable of retaining water to the same level in $N_2$ (<100 ppb).

Referring to FIG. 3, the composition of Example I exhibits the ability to remove water moisture from HCl to levels less than 100 ppb. FIG. 3 shows three FT-IR spectra at 1772 cm$^{-1}$ to illustrate the water retention ability of the composition of Example I in HCl.

HCl dried by the conventional purifier and which bypasses the composition of Example I is denoted "Dry HCl". "Water" refers to the wet (4 ppm) HCl gas stream which bypasses the composition of Example I and "New purifier+Water" refers to the wet HCl passed through the composition of Example I. It is evident from the spectra that there is no difference between "Dried $N_2$" and "New purifier+Water" indicating that the conventional purifier and the composition of Example I are capable of retaining water to the same level in HCl (<100 ppb).

The invention claimed is:

1. A method of removing water from gaseous HCl by passing the HCl stream containing water over an adsorbent of anhydrous $MgCl_2$ supported on an activated carbonaceous substrate that is liquid hydrogen halide tolerant.

2. The method of claim 1 including the step of activating the adsorbent by heating the adsorbent prior to passing the HCl stream containing water over said adsorbent.

3. The method of claim 2 wherein the adsorbent is heated to a temperature of about 240° C.

4. The method of claim 1 wherein the concentration of $MgCl_2$ is at least about 0.1 moles of $MgC_2$ per liter of substrate.

5. The method of claim 1 wherein the concentration of $MgCl_2$ is at least about 1.2 moles of $MgCl_2$ per liter of substrate.

6. The method of claim 1 wherein at least about 1.8% by weight $MgCl_2$ is present on the substrate.

7. The method of claim 1 wherein at least about 17.7% by weight $MgCl_2$ is present on the substrate.

8. The method of claim 1 wherein the HCl stream contains about 4 ppm water.

9. The method of claim 1 wherein the substrate is macroporous.

10. The method of claim 1 wherein the resultant HCl contains less than about 100 ppb water.

11. A method of removing water from HCl by passing the HCl stream containing water over an adsorbent of anhydrous magnesium chloride supported on an activated carbonaceous support that is liquid hydrogen halide tolerant; wherein the anhydrous magnesium chloride supported on the activated carbonaceous substrate is produced by depositing a solution of dialkyl magnesium in an amount sufficient to coat the surface and fill the void volume of the porous carbonaceous substrate; and contacting the substrate with hydrogen chloride to convert the dialkyl magnesium to magnesium chloride.

12. The method of claim 11 including the step of activating the adsorbent by heating the adsorbent prior to passing said HCl stream containing water over said adsorbent.

13. The method of claim 12 wherein the adsorbent is heated to a temperature of about 240° C.

14. The method of claim 11 wherein the concentration of magnesium chloride is at least about 0.1 moles of magnesium chloride per liter of carbonaceous support.

15. The method of claim 11 wherein the concentration of magnesium chloride is at least about 1.2 moles of magnesium chloride per liter of carbonaceous support.

16. The method of claim 11 wherein the support is macroporous.

17. A method of removing water from a hydrogen halide fluid by passing the hydrogen halide stream containing water over an adsorbent of anhydrous magnesium halide supported on a carbonaceous substrate that is liquid hydrogen halide tolerant, wherein said carbonaceous substrate does not react with said hydrogen halide to produce products which contaminate the hydrogen halide.

18. The method of claim 17 wherein said carbonaceous substrate does not react with said hydrogen halide to produce particulate products which contaminate the dehydrated hydrogen halide.

19. The method of claim 17 wherein said substrate is an activated carbonaceous support.

20. The method of claim 19 wherein said substrate is macroporous.

21. The method of claim 17 wherein said substrate is macroporous.

22. The method of claim 17 wherein said hydrogen halide is hydrogen chloride and said magnesium halide is magnesium chloride.

23. The method of claim 17 wherein said hydrogen halide is hydrogen bromide and said magnesium halide is magnesium bromide.

24. A method of removing water from a hydrogen halide fluid by passing the hydrogen halide stream containing water over an adsorbent of anhydrous magnesium halide supported on a carbonaceous substrate at pressures of about 1100 psig at 50° C., thereby producing dehydrated hydrogen halide, wherein said carbonaceous substrate is liquid hydrogen halide tolerant and does not react with said hydrogen halide to produce products which contaminate the dehydrated hydrogen halide and; wherein the magnesium halide supported on the activated carbonaceous substrate is produced by depositing a solution of dialkyl magnesium in an amount sufficient to coat the surface and fill the void volume of the porous carbonaceous substrate; and contacting the substrate with hydrogen halide to convert the dialkyl magnesium to magnesium halide.

25. A method of removing water from liquid HCl by passing the HCl stream containing water over an adsorbent of anhydrous $MgCl_2$ supported on an activated carbonaceous substrate that is liquid hydrogen halide tolerant.

* * * * *